United States Patent Office 3,494,847
Patented Feb. 10, 1970

3,494,847
ELECTRODEPOSITION PROCESS USING IMINE-MODIFIED COMPOSITIONS
Michael Yurcheshen, Parma Heights, and Morris Levine Cleveland Heights, Ohio, assignors to PPG Industries, Inc., Pittsburgh, Pa., a corporation of Pennsylvania
No Drawing. Filed Oct. 25, 1966, Ser. No. 589,212
Int. Cl. C23b *13/00;* B01k *5/02*
U.S. Cl. 204—181         11 Claims

ABSTRACT OF THE DISCLOSURE

Water-dispersed coating compositions comprising imine-modified polycarboxylic acid resins are provided by reacting some of the free carboxyl groups of a polycarboxylic acid resin with an alkylenimine or substituted alkylenimine and neutralizing all or part of the other carboxyl groups. Among the useful polycarboxylic acid resins are adducts of a fatty acid ester and an acid or anhydride, such as maleinized oils, as well as polyesters and hydroxyalkyl ester interpolymers. The use of coating compositions containing these modified resins in electrodeposition processes provide coatings having highly desirable properties, such as good corrosion resistance, and are particularly useful over oily steel surfaces.

---

This invention relates to imine-modified polycarboxylic acid resins suitable for use in electrodeposition processes and for other purposes, and to electrodeposition of coating compositions containing such modified products.

Electrodeposition, although known for some time, has only recently become of commercial importance as a coating application method. Along with the increased use of such methods has been the development of certain compositions which can provide satisfactory coatings when applied in this manner. While many compositions can be electrodeposited, most coating compositions when applied using electrodeposition techniques do not produce commercially usable coatings. Moreover, electrodeposition of many coating materials, even when otherwise successful, is often attended by various disadvantages such as non-uniform coatings and by poor throwing power.

As indicated above, various coating compositions can be applied by electrodeposition techniques. The coatings achieved, however, have in most instances been deficient in certain properties essential for their utilization in many applications for which electrodeposition is otherwise suited. For example, properties such as corrosion resistance, hardness, alkali resistance, and similar characteristics necessary for coatings are difficult to achieve, especially with water-dispersed resins such as are employed in electrodeposition processes. A particular problem is encountered in commercial operations, where the steel to be coated often has an oily film on its surface, which tends to reduce the resistance of the coating to corrosion.

It has now been found that polycarboxylic acid resins containing carboxylic acid groups modified by reaction with an alkylenimine or substituted alkylenimine provide highly advantageous results and coatings that can be successfully applied by electrodeposition. These modified products can be themselves the sole film-forming constituent of the coating composition, or they can be included in such a composition along with one or more film-forming materials. Among the properties of the coatings herein are the desirable properties ordinarily associated with the electrodepositable polycarboxylic acid resins in general and, in addition, these modified resins provide unique advantages and properties to the coated products, such as increased corrosion resistance. In many cases, oily steel surfaces can be provided with coatings having excellent resistance to salt-spray and similarly corrosive elements, by electrodepositing or otherwise applying the compositions herein over such oily steel surfaces.

The compositions of the invention are water-dispersed products made by reacting some of the free carboxyl groups of polycarboxylic acid resin with an alkylenimine or substituted alkylenimine, and neutralizing all or part of the other carboxyl groups to provide a product that is soluble or dispersible in water. The term "water-dispersed" as used herein means dissolved and/or dispersed in water so that the resin does not settle upon standing for a reasonable period.

Essentially any polycarboxylic acid resin containing free carboxyl groups can be utilized in the invention. These may include both natural resins, such as shellac, rosin and rosin derivatives and the like, and the more preferred synthetic polycarboxylic acid resins, such as polyesters, epoxy esters, acrylics, acid-modified oils, and interpolymers of various types containing copolymerized carboxylic acids or anhydrides and which retain free carboxyl groups. By reacting some of the carboxyl groups with an imine, as described herein, improved properties are attained although the overall properties of the coating may make it useful only for certain specialty applications.

Several polycarboxylic acid resins, when modified with an imine in accordance with the invention, can be electrodeposited or otherwise applied with especially good results to provide coatings of highly desirable properties for many widely used applications. One such preferred class of coating compositions are those in which the polycarboxylic acid resin is an at least partially-neutralized reaction product of a drying oil fatty acid ester with an alpha, beta-ethylenically unsaturated dicarboxylic acid or an anhydride of such an acid. The composition may also comprise the reaction product of the ester, acid or anhydride and one or more other ethylenically unsaturated monomers. The initial reaction products as above may also be partially reacted with an alcohol to esterify part of the carboxylic groups from the acid or anhydride prior to reaction of some of the carboxylic groups with an imine and neutralization of all or part of the remaining acidic radicals with a base.

The fatty acid esters used to make the aforesaid vehicles are esters of fatty acids which are or can be derived from drying oils or from such sources as tall oil. (By "drying oil" is meant those oils having an iodine number of greater than 90, thus including so-called "semi-drying oils.") Examples of such esters include linseed oil, safflower oil, perilla oil, tung oil, oiticica oil, sunflower oil, tall oil esters, dehydrated caster oil, fish oils, and the like.

The fatty acid ester may also be an alkyd resin prepared utilizing semi-drying or drying oil; an ester of an epoxide with the fatty acids mentioned above; a semi-drying or drying oil fatty acid ester of a polyol; or a semi-drying or drying oil fatty acid ester of a resinous polyol. The ester can also be modified with other acids, such as saturated, unsaturated or aromatic acids, as well as with such acid materials as rosin.

The unsaturated dicarboxylic acid or anhydride may be an anhydride, such as maleic anhydride or itaconic anhydride, or an unsaturated dicarboxylic acid, for example, maleic acid, itaconic acid or fumaric acid. There may also be employed mixtures of any of the above acids or anhydrides. Usually the anhydride or acid employed contains from 4 to 12 carbon atoms. The reaction between the acid or anhydride and the fatty acid ester takes place readily without the use of a catalyst at temperatures between about 100° C. and about 300° C., depending primarily upon the type of fatty acid ester used.

As indicated, the reaction product can also include one or more other ethylenically unsaturated monomers in polymerized form. Essentially, any ethylenically unsaturated monomer, e.g., those containing $CH_2=C<$ groups, can be employed for this purpose, with the preferred compounds being styrene, substituted styrenes, alkyl acrylates, alkyl methacrylates, diolefins and acrylonitrile. When such an additional monomer is employed, the reaction is best carried out by first reacting the acid or anhydride with the fatty acid ester and then reacting this product with the monomer at somewhat lower temperatures.

Although the proportions of the components in the foregoing reaction products are not critical, it is preferred to utilize between about 8 percent and about 45 percent by weight of the unsaturated acid anhydride with about 55 percent to about 92 percent by weight of fatty acid ester. If an ethylenically unsaturated monomer is included, it is typically used in amounts between about 5 percent and about 35 percent by weight based upon the total weight of acid or anhydride and ester.

Another preferred class of polycarboxylic acid resins are esters of unsaturated carboxylic acids, unsaturated carboxylic acids and at least one other ethylenically unsaturated monomer. The acid monomer of the interpolymer is usually acrylic acid or methacrylic acid, but other ethylenically unsaturated monocarboxylic and dicarboxylic acids, such as ethacrylic acid, crotonic acid, maleic or other acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diesters of the dicarboxylic acids mentioned are included. Ordinarily, the acid and ester each comprise between about 1 percent and about 20 percent by weight of the interpolymer, with the remainder being made up of one or more other copolymerizable ethylenically unsaturated monomers. Most often used are the alkyl acrylates, such as ethyl acrylate, butyl acrylate, 2-ethylhexyl acrylate etc.; the alkyl methacrylates, such as methyl methacrylate, butyl methacrylate, lauryl methacrylate, etc.; and the vinyl aromatic hydrocarbons, such as styrene and vinyl toluene; but others can also be utilized.

The amine-aldehyde condensation products which may be included in these compositions are typically condensation products of melamine, benzoguanimine, or urea with formaldehyde, although other amino-containing amines and amides and other aldehydes, such as acetaldehyde, can also be employed. The alkylol groups of the products are often etherified by reaction with an alcohol such as methanol or butanol, and the products utilized can be water-soluble or organic solvent-soluble. These compositions can also include a polyepoxide, which can be any epoxide compound or mixture with an epoxy functionality of greater than 1.0. Included are polyglycidyl ethers of polyphenols, such as Bisphenol A, or of aliphatic polyhydric alcohols, such as 1,4-butanediol; polyglycidyl esters of polycarboxylic acids, such as diglycidyl adipate, and polyepoxides from the epoxidation of unsaturated alicyclic compounds, such as 3,4-epoxycyclohexylmethyl-3,4-epoxy-cyclohexanecarboxylate.

Still another class of polycarboxylic acid resins of desirable properties, some of which are often preferred in the invention, comprises polyesters having free carboxyl groups. Such polyesters (or alkyds) are made by reacting a polycarboxylic acid and a polyol, using reactant ratios and conditions such as to give a relatively high acid number, e.g. 30 to 70 or higher. A number of these are known in the art and may be employed. Thus, for example, the alkyd may be made from such polyfunctional acids as phthalic acid, maleic acid, fumaric acid, isophthalic acid, succinic acid, trimellitic acid, adipic acid, azelaic acid, sebacic acid, linoleic acid, fatty acids and the like, as well as from anhydrides of such acids. The polyfunctional alcohol can be, for example, glycerine, trimethylolethane, trimethylolpropane, pentaerythritol, sorbitol, mannitol, ethylene glycol, diethylene glycol, 2,3-butylene glycol, and similar polyols.

Preferred are water-dispersible alkyds, such as a conventional alkyd (such as a glyceryl phthalate resin), which may be modified with drying oil fatty acids, made with a high acid number, or those in which a surface active agent, such as a apolyalkylene glycol (e.g., "Carbowax"), incorporated. High acid number alkyds are also made by employing a tricarboxylic acid, such as trimellitic acid or anhydride, along with a polyol, in making the alkyd.

The above alkyds are usually combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl) melamine.

Various alkylenimines and substituted alkylenimines can be used to modify the acidic groups in the above polycarboxylic acid resins. These correspond generally to the formula:

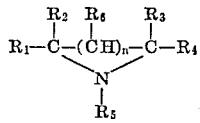

where $R_1$, $R_2$, $R_3$, $R_4$ and $R_5$ are each either hydrogen alkyl, such as methyl, ethyl, propyl, or the like, having for example, up to about 20 carbon atoms; aryl, such as phenyl or the like; alkaryl, such as tolyl, xylyl or the like; or aralkyl, such as benzyl, phenethyl or the like. $R_6$ in the above formula is hydrogen or a lower alkyl radical usually having not more than about 6 carbon atoms, and $n$ is 0 or 1.

The groups designated by the above formula include substituted radicals of the classes indicated, including substituents such as cyano, halo, amino, hydroxy, alkoxy, carbalkoxy, and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present. It will be seen that compounds containing certain combinations of the above groups cannot be obtained because of factors such as steric hindrance or intramolecular interaction. For this reason, in most of the compounds of the class described, one and usually several of the groups designated by $R_1$ through $R_6$ will represent hydrogen. However, the efficacy of the various imines within the above formula does not depend upon the particular nature of any of the substituents and thus, beneficial results are obtained with interpolymers modified by any of those compounds within the above class.

To exemplify the compounds which can be used, examples of imines within the scope of the formula set forth above are as follows: Ethylenimine (aziridine), 1,2-propylenimine (2-methyl aziridine), 1,3-propylenimine (azetidine), 1,2-dodecylenimine (2-decyl aziridine), 1,1-dimethyl ethylenimine (2,2-dimethyl aziridine), tolyl ethylenimine (2-(4-methylphenyl)aziridine), benzyl ethylenimine (2-phenylmethyl aziridine), 1,2-diphenyl ethylenimine (2,3-diphenyl aziridine), aminoethyl ethyleimine (2-(2-aminoethyl)aziridine), 3-chloropropyl ethylenimine (2 - (3 - chloropropyl)aziridine), methoxyethyl ethylenimine (2 - (2 - methoxyethyl)aziridine), dodecyl aziridinyl formate (dodecyl 1-aziridinyl carboxylate), carbethoxyethyl ethylenimine (2 - (2 - carbethoxyethyl) aziridine), N-butyl ethylenimine (1-butyl aziridine), N-(2-aminoethyl)ethylenimine (1-(2-aminoethyl)aziridine), N-(cyanoethyl)ethylenimine (1-cyanoethyl aziridine), N-phenyl ethylenimine (1-phenyl aziridine), N-(p-chlorophenyl)ethylenimine (1-(4-chlorophenyl)aziridine).

Because of their availability and because they have been found to be among the most effective, the preferred imines are alkylenimines having 2 to 4 carbon atoms, and especially ethylenimine and 1,2-propylenimine.

The reaction with the imine takes place upon admixing the imine and the carboxyl-containing material and heating to moderate temperatures, say 50° C. to 150° C., although higher or lower temperatures can be used, depending upon the desired reaction time. Basing the extent of reaction upon the amount of imine employed, it is only necessary that at least about 0.1 percent by weight of acidic units, consisting of copolymerized acid and based upon the total polycarboxylic acid resin, be reacted with imine.

The reaction with the imine is preferably carried out during or after the polymerization to produce the polycarboxylic acid resin. While often the imine reaction is carried out with the polycarboxylic acid resin as such, it can also be carried out concurrently with the polymerization reaction, or even with the polycarboxylic acid itself. Similarly, the reaction with imine preferably takes place prior to neutralization, but in some cases the imine can be reacted during or even after the neutralization.

Neutralization of these products is accomplished by reaction of all or part of the carboxylic acid (or anhydride) groups with a base. The extent of neutralization depends upon the particular resin, and it is only necessary that sufficient base be added to solubilize or disperse the resin as desired. Inorganic bases, such as metal hydroxides or, more desirably, ammonia, can be used for this purpose, as can organic bases, particularly amines. Among the preferred class of neutralizing bases are ammonia and any basic amine, including alkyl amines, cycloalkyl amines, unsaturated amines, aromatic amines, aryl amines, aralkyl amines, cyclic amines, diamines and substituted amines, of the primary, secondary, tertiary or quaternary amine types.

It is sometimes preferred that the neutralization reaction be carried out in such a manner that amido groups are attached to part of the carbonyl carbon atoms of the carboxyl groups. By amido groups are meant trivalent nitrogen atoms attached with one valence to the carbonyl carbon atom, with the other two valences being linked to hydrogen or carbon atoms in the same or different organic radicals. Amido groups are generally formed when the reaction with the neutralizing base is carried out with a water solution of ammonia, a primary amine or a secondary amine, or when the product is reacted with such an amine in the absence of water.

The coating compositions comprising the above modified products are dispersed in water. The concentration depends upon the use intended and is in general not critical. For electrodeposition processes, the major proportion of the dispersed composition is water, e.g., the composition may contain 1 to 25 percent by weight of resin. In most instances a pigment composition and, if desired, various additives such as anti-oxidants, surface active agents and the like are included. The pigment composition may be of any conventional type, comprising, for example, iron oxides, lead oxides, strontium chromate, carbon black, titanium dioxide, talc, barium sulfate, as well as color pigments such as cadmium yellow, cadmium red, chromic yellow and the like. Better results with pigmented compositions are usually attained if the weight ratio of pigment solids to vehicle solids is not higher than about 1.5 to 1, and preferably not higher than about 1 to 1.

The water-dispersed compositions of the invention can be applied by various methods. Because compositions which can be electrodeposited are especially valuable, emphasis is placed herein upon the utility of the water-dispersed coating compositions in electrodeposition processes. However, it should be noted that these compositions can also be applied by any conventional means, such as by brushing, rolling or dipping. The use of these water-dispersed compositions as a dip primer is advantageous in many instances, giving increased salt-spray resistance and other improved properties. Thus, it is not intended that the invention be limited by the discussion and examples herein relating to electrodeposition, although the utility of these compositions in such processes makes them especially valuable.

In electrodeposition processes employing the water-dispersed coating compositions described above, the aqueous coating composition is placed in contact with an electrically conductive anode and an electrically conductive cathode, with the surface to be coated being the anode. Upon the passage of electric current between the anode and the cathode, while in contact with the bath containing the coating composition, an adherent film of the coating composition is deposited on the anode. The conditions under which the electrodeposition step herein is carried out are those conventionally used in electrodeposition of coatings. The applied voltage may be varied greatly and can be, for example, as low as 1 volt or as high as several thousand volts, although typically between 50 volts and 500 volts. The current density is usually between about 0.1 ampere and 15 amperes per square foot, and tends to decrease during the electrodeposition.

The method of the invention is applicable to the coating of any conductive substrate, and especially such as steel, aluminum, copper or the like. As indicated above the invention is applicable to the coating of oily steel (or other metals) and provides coatings thereon having improved corrosion resistance in many instances.

Illustrating the invention are the following examples, which, however, are not to be construed as limiting the invention to their details. All parts and percentages in the examples, as well as throughout this specification, are by weight unless otherwise specified.

EXAMPLE 1

A mixture of 180.2 parts of soybean fatty acids, 232.2 parts of bis(4-hydroxycyclohexyl)2,2-propane and 87.7 parts of 1,4-butanediol is heated to 270° F. and 180.2 parts of trimellitic anhydride are added. The mixture is heated to 370° F. and maintained at this temperature until the acid number is 45–50. After cooling, 105.5 parts of 4-methoxy-4-methylpentanone-2, 105.5 parts of methyl ethyl ketone and 3.8 parts of 1-2,propylenimine are added at 180° F.–190° F. and the mixture kept at this temperature for ½ hour. The imine-modified polyester obtained is then mixed with 12 parts of diethylamine and sufficient deionized water to make the total non-volatile solids content 40 percent.

For use in electrodeposition the above water-dispersed composition is further reduced to a solids content of 10 percent and electrodeposited onto steel panels. The apparatus comprises an insulated tank containing the steel panel as the anode and a steel cathode both immersed in the aforesaid composition which is maintained at 75° F. A potential of 200 volts is applied between the electrodes for 120 seconds, whereupon an adherent coating 0.8 mil thick (dry) is deposited on the anode. The coating is rinsed with deionized water and baked at 360° F. for 25 minutes.

Using the above procedure and composition, hard coatings of good appearance and desirable properties are obtained, even when the anode is oily steel, i.e. steel having an oily film on the surface. By contrast, electrodeposition of a corresponding composition, made as above but omitting the imine, onto oily steel gives a coating which is rougher and less adherent and having poorer properties such as corrosion resistance.

EXAMPLE 2

A 4 to 1 mixture of linseed oil and maleic anhydride is heated at about 500° F. until the acid number of the product is about 90. The resultant maleinized linseed oil (1500 parts) is mixed with 15 parts of 1,2-propylenimine at 150° F. and maintained at that temperature for 1 hour. The product is solubilized by mixing with 175 parts of diethylamine at room temperature for 45 minutes and then adding 15 parts of cresylic acid and sufficient deionized water to make the total non-volatile solids content 40 percent.

The product when reduced and electrodeposited as in Example 1 also produces electrodeposited coatings of good properties.

EXAMPLE 3

A mixture of 259.2 parts of soybean fatty acids, 273.8 parts of hydrogenated Bisphenol A and 121.5 parts of diethylene glycol are heated to 270° F., and 154.3 parts of maleic anhydride and 13.3 parts of xylene are added and the temperature raised to 380° F. Heating is continued until the acid number is about 50; the mixture is then cooled to 150° F. and 3.3 parts of ethylenimine are added. After ½ hour, 84.6 parts of methyl ethyl ketone are added. The product has a total solids content of 90 percent. It is solubilized by adding 7 parts of dimethylamine and sufficient deionized water to make the solids content 10 percent. Electrodeposition of this composition in the manner described above produces a coating of desirable properties.

In a similar manner, other compositions as described herein provide advantageous results. For example, acrylic interpolymers containing acid monomers can be reacted with imines and electrodeposited, with or without other resins such as polyepoxides or amine-aldehyde resins. Also, other imines, such as N-hydroxyethyl ethylenimine or the others mentioned above, and other neutralizing agents, such as morpholine, ammonia, sodium hydroxide, and others, can be used in place of those in the examples, and other conditions and substrates can be utilized in the electrodeposition of these and other compositions. Further, pigments can be added to the compositions in the usual manner to produce colored coatings as desired.

According to the provisions of the patent statutes, there are described above the invention and what are now considered to be its best embodiments. However, within the scope of the appended claims, it is to be understood that the invention can be practiced otherwise than as specifically described.

What is claimed is:

1. A method of coating an electrically conductive substrate which comprises passing electric current between an electrically conductive cathode and an electrically conductive anode in contact with a water-dispersed coating composition comprising an at least partially neutralized polycarboxylic acid resin, said polycarboxylic acid resin containing at least about 0.1 percent by weight of carboxylic acid units which have been reacted with an imine of the formula:

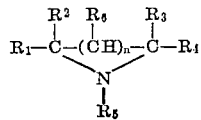

where $R_1$, $R_2$, $R_3$, $R_4$ and $R_5$ are each hydrogen, alkyl, aryl, alkaryl or aralkyl, $R_6$ is hydrogen or lower alkyl, and $n$ is 0 or 1.

2. The method of claim 1 in which said polycarboxylic acid resin is selected from the class consisting of:
   (a) addition products of a drying oil fatty acid ester and an ethylenically unsaturated dicarboxylic acid or anhydride;
   (b) polyesters containing unreacted carboxyl groups; and
   (c) interpolymers of a hydroxyalkyl ester of an unsaturated carboxylic acid and at least one other ethylenic monomer.

3. The method of claim 1 in which said polycarboxylic acid resin is the addition product of a drying oil fatty acid ester and from about 8 to about 45 percent, based on the weight of said addition product, of an alpha-beta ethylenically unsaturated dicarboxylic acid or anhydride.

4. The method of claim 3 in which said addition product is a maleinized oil.

5. The method of claim 1 in which said polycarboxylic acid resin is a polyester of a polyol and a molar excess of polycarboxylic acid or anhydride.

6. The method of claim 1 in which said polycarboxylic acid resin is a fatty acid modified polyester.

7. The method of claim 1 in which said polycarboxylic acid resin is an interpolymer of from about 1 to 20 percent by weight of a hydroxyalkyl ester of an ethylenically unsaturated carboxylic acid, from about 1 to about 20 percent by weight of an ethylenically unsaturated carboxylic acid, and at least one other copolymerizable ethylenic monomer.

8. The method of claim 1 in which said imine is an alkylenimine of from 2 to 4 carbon atoms.

9. The method of claim 1 in which said polycarboxylic acid resin is neutralized with ammonia or an amine.

10. The method of claim 1 in which said anode is oily steel.

11. An article comprising a surface having thereon an adherent coating produced by the method of claim 1.

References Cited

UNITED STATES PATENTS

| | | | |
|---|---|---|---|
| 3,223,681 | 12/1965 | Rambosek. | |
| 3,230,162 | 1/1966 | Gilchristi | 204—181 |
| 3,261,796 | 7/1966 | Simms. | |
| 3,261,797 | 7/1966 | McDowell et al. | |
| 3,268,433 | 8/1966 | Abere | 204—181 |
| 3,290,416 | 12/1966 | Christenson et al. | |
| 3,309,331 | 3/1967 | McDowell et al. | |
| 3,386,939 | 6/1968 | Mesec. | |

JOHN H. MACK, Primary Examiner

E. ZAGARELLA, Jr., Assistant Examiner

U.S. Cl. X.R.

260—29.6